United States Patent [19]
Esmond

[11] 3,912,637
[45] Oct. 14, 1975

[54] EXCHANGE DEVICE

[76] Inventor: William G. Esmond, 537 Stamford Road, Baltimore, Md. 21229

[22] Filed: June 4, 1971

[21] Appl. No.: 149,952

[52] U.S. Cl. .............................. 210/321; 23/258.5
[51] Int. Cl.[2] ................... B01D 31/00; B01D 13/00
[58] Field of Search ..................... 210/321; 23/258.5

[56] References Cited
UNITED STATES PATENTS

| | | | |
|---|---|---|---|
| 3,459,310 | 8/1969 | Edwards | 210/321 |
| 3,541,595 | 11/1970 | Edwards | 210/321 |
| 3,547,271 | 12/1970 | Edwards | 210/321 |
| 3,565,258 | 2/1971 | Lavender et al. | 210/321 |

OTHER PUBLICATIONS

Ulmschneider et al., "Artificial Dializing Body Organ," Def. Pub. No. T867,005, published Oct. 21, 1969.

*Primary Examiner*—Frank A. Spear, Jr.
*Attorney, Agent, or Firm*—Diller, Brown, Ramik & Wight

[57] ABSTRACT

This disclosure relates to an exchange assembly which may be utilized to any purpose, but is preferably in the form of an exchange assembly which may be utilized for medical purposes such as an artifical kidney. A plurality of plates are arranged in stacked relation with each plate having a tubular membrane surrounding the same. The plates are clamped together by manifold members and manifold ports are formed through the stack for delivering a first fluid across the faces of the plates within the membrane. Other manifolds are secured in sealed relation to the edges of the stack and are arranged for distributing a second fluid between the membranes carried by the plates. The plates are of a special construction so as to facilitate uniform flow.

11 Claims, 10 Drawing Figures

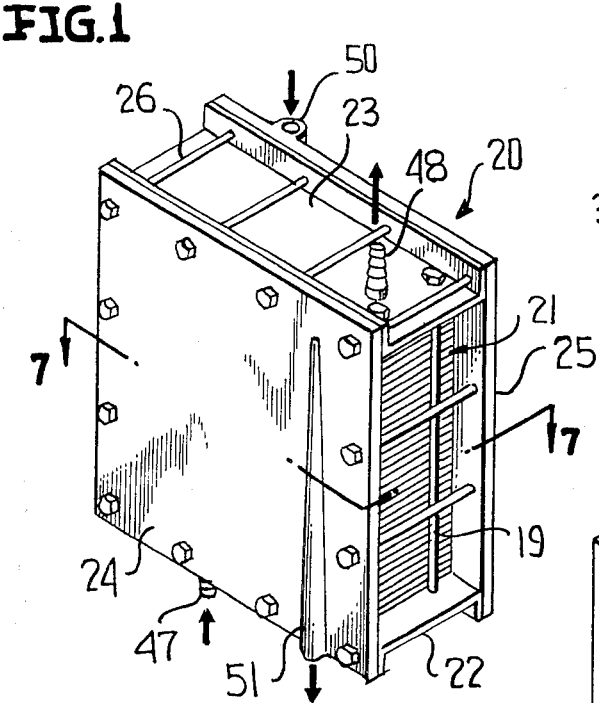
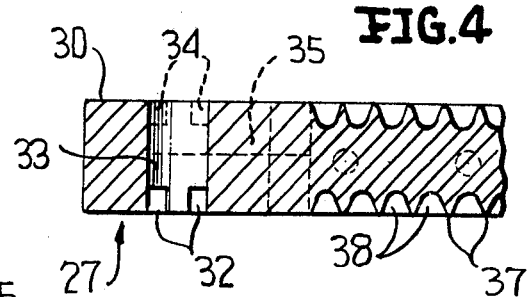
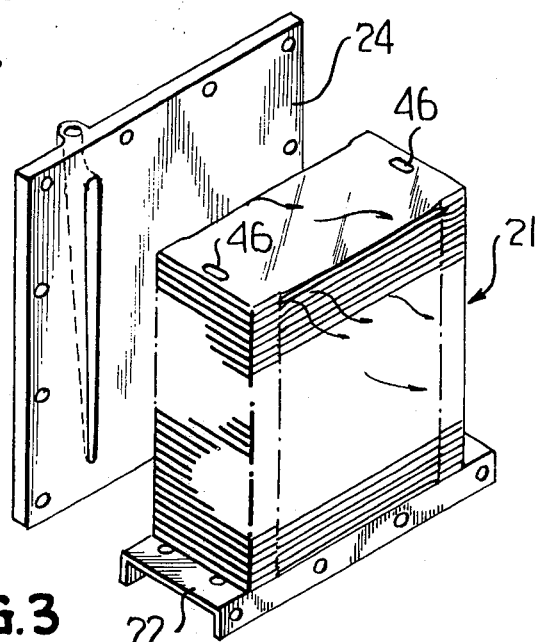
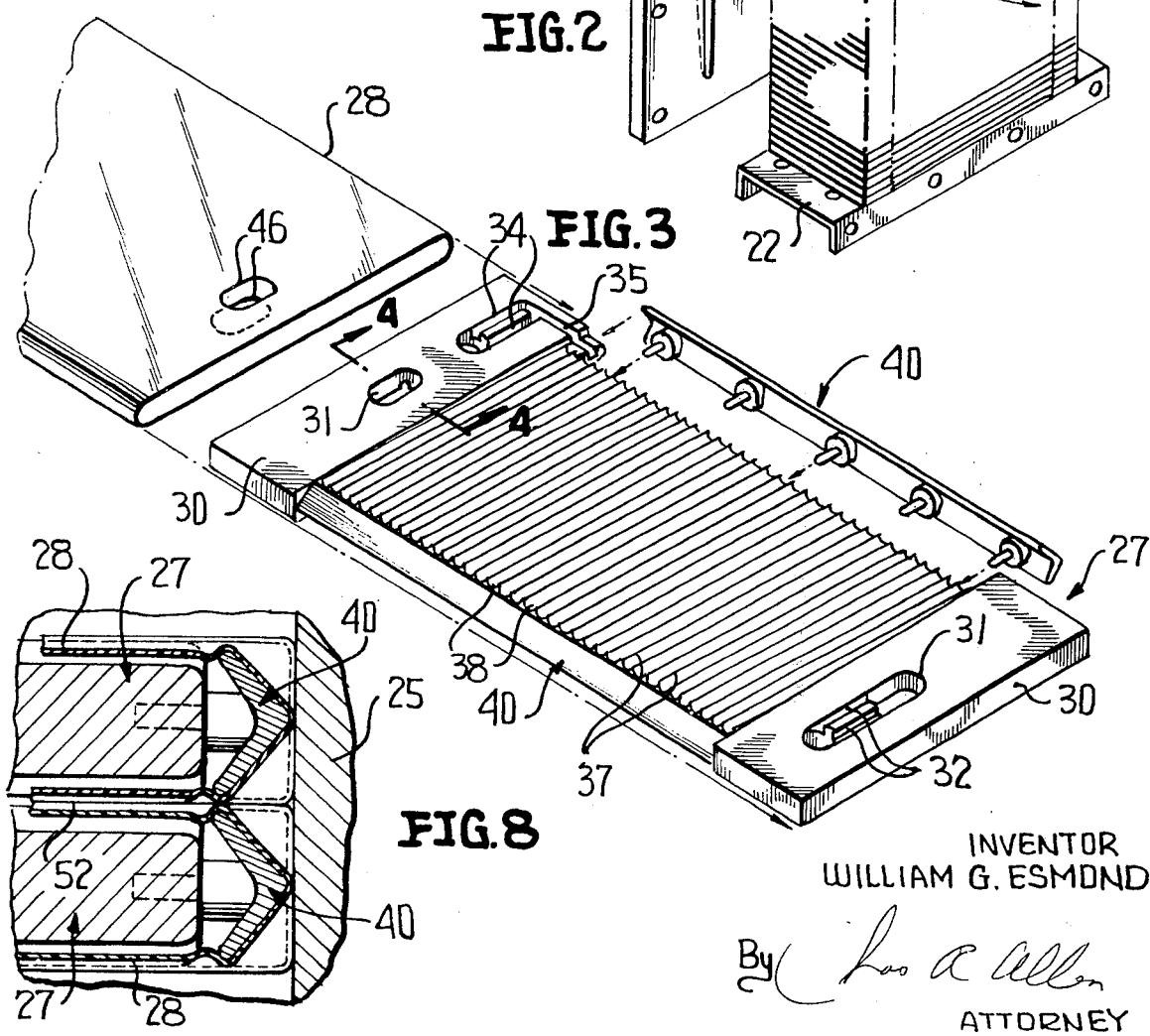

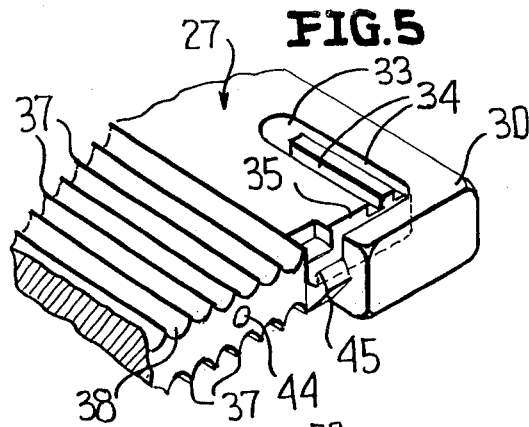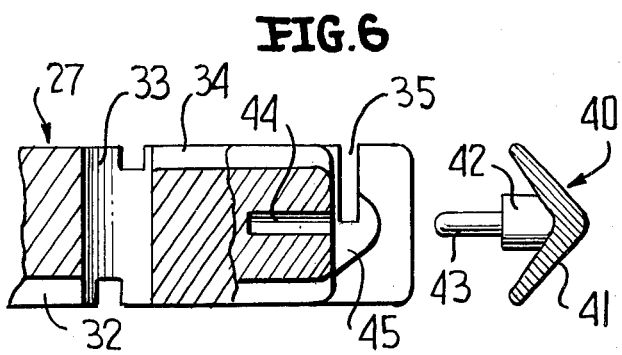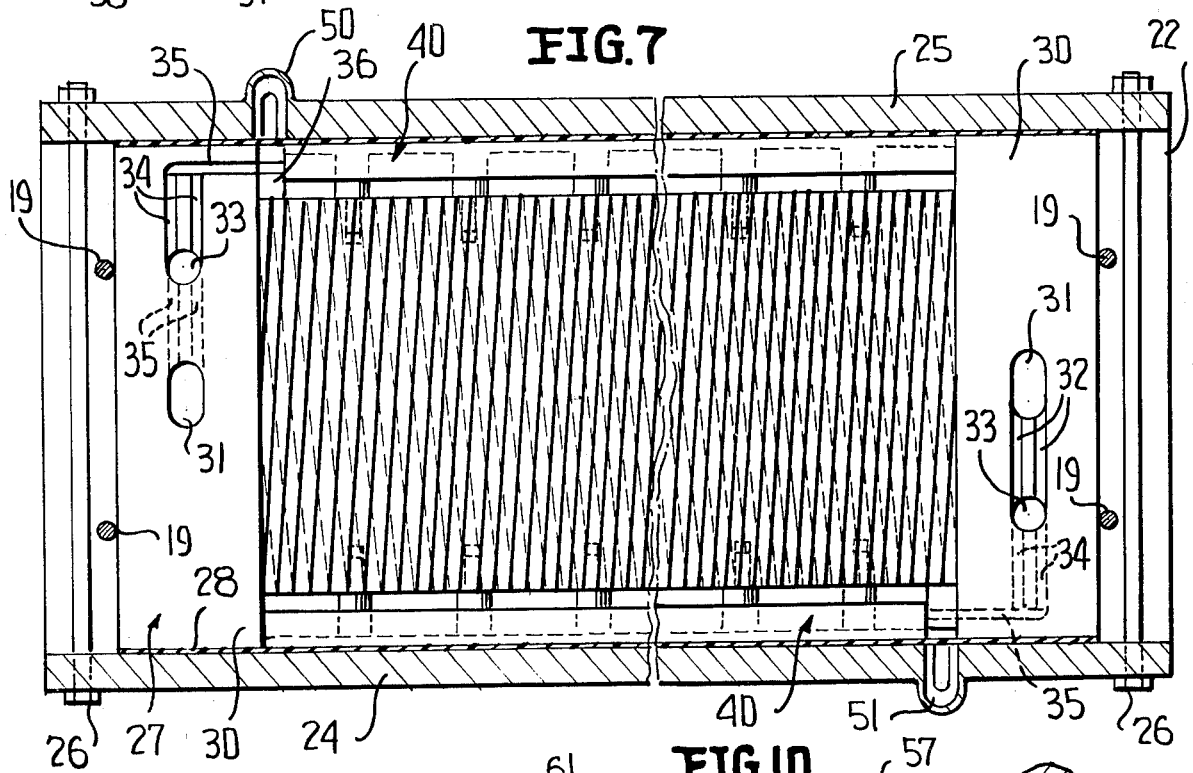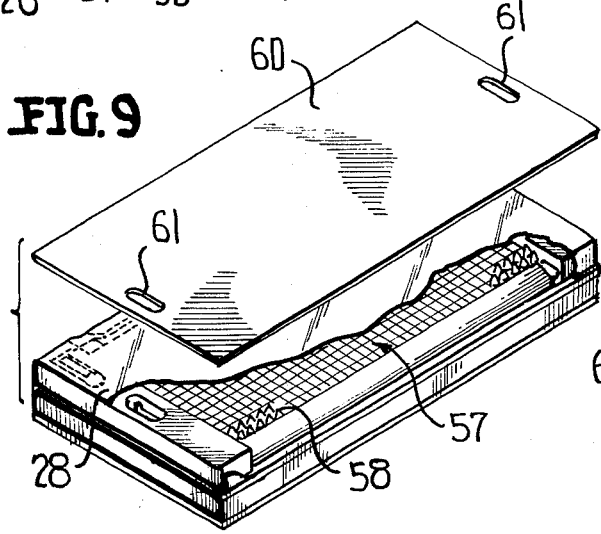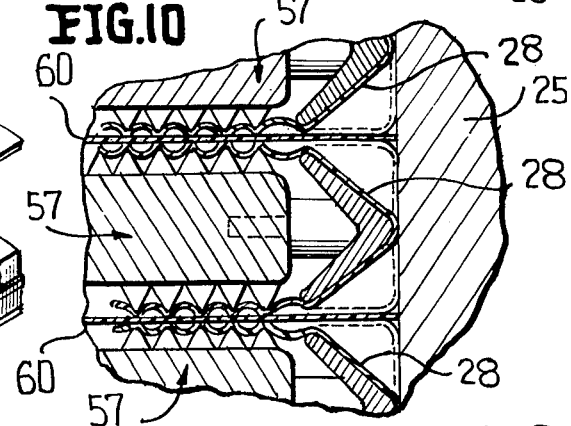

EXCHANGE DEVICE

This invention relates in general to new and useful improvements in exchange assemblies, and more particularly to an exchange assembly which may be utilized for medical purposes, such as an artificial kidney.

BACKGROUND OF THE INVENTION

It is well known to provide artificial kidneys and like exchange devices. It is also well known to construct artificial kidneys and like exchange devices of a plurality of flow plates which are separated by a suitable membrane. It is further well known to so construct the flow plates whereby they may be readily cleansed and reused after sterilization. However, difficulties have been experienced in the past in assembling the flow plates with the membrane, and forming seals between the various manifolds and the flow plates, and the dividing of the flowing fluids so that the uniform flow occurs at all times.

SUMMARY OF THE INVENTION

In accordance with this invention, it is proposed to provide an exchange assembly which is formed of a plurality of flow plates arranged in a stack. Each flow plate is provided with a tubular membrane which extends the full length of the flow plate and when the flow plates are clamped together, serves as a seal against the escape of fluid flowing within the membrane and across the surface of each flow plate.

The flow plates and the membranes are readily assembled and all that is required is to slide the membranes over the flow plates. After this minor assembling operation has been completed, it is merely necessary to clamp the flow plates between a pair of clamp type manifold plates, followed by the securing in place of other manifold plates which oppose the edges of the stack of flow plates for distributing a second fluid between the membranes of adjacent flow plates.

The flow plates are particularly constructed so as to facilitate the flow of a fluid therearound and within the associated membranes. To this end, the opposite edges of the flow plates are provided with removable nose pieces which function to define distribution and collection channels extending generally along and adjacent opposite edges of each flow plate. When the nose pieces are removed, the flow plates may be readily cleansed and a sanitary condition restored so that the flow plates are readily reuseable.

It is also to be understood that the various components of this exchange assembly are formed of relatively inexpensive material so that the initial cost of the exchange assembly is relatively low and, if necessary, the entire flow plate assembly may be disposed of after each usage.

With the above and other objects in view that will hereinafter appear, the nature of the invention will be more clearly understood by reference to the following detailed description, the appended claims and the several views illustrated in the accompanying drawings:

In the drawings:

FIG. 1 is a perspective view of the exchange assembly and shows the over-all details thereof.

FIG. 2 is a fragmentary exploded perspective view of the exchange assembly of FIG. 1 rotated 90° with two of the manifold plates omitted and one other manifold plate being separated from the stack.

FIG. 3 is an enlarged fragmentary exploded perspective view showing one of the flow plates with one of the nose pieces thereof disassembled therefrom, together with a tubular membrane ready to be installed over the flow plate.

FIG. 4 is an enlarged fragmentary sectional view taken along the line 4—4 of FIG. 3 and shows further the details of the flow plate.

FIG. 5 is an enlarged fragmentary perspective view of one corner of the flow plate with the nose piece removed.

FIG. 6 is an enlarged fragmentary exploded sectional view taken transversely of the flow plate and displaced nose piece adjacent one end thereof and shows further the constructional details.

FIG. 7 is an enlarged horizontal sectional view taken along the line 7—7 of FIG. 1 and shows specifically the details of the exchange assembly.

FIG. 8 is an enlarged fragmentary transverse sectional view through the central portion of the flow assembly adjacent one end thereof and shows further details thereof.

FIG. 9 is a fragmentary exploded perspective view with parts broken away and showing the details of a slightly modified form of flow plate assembly.

FIG. 10 is an enlarged fragmentary sectional view similar to FIG. 8 and shows the exchange assembly with the flow plate of FIG. 9.

Referring now to the drawings in detail, it will be seen that there is illustrated in FIG. 1 an exchange assembly which is formed in accordance with this invention, the exchange assembly being generally identified by the numeral 20. The exchange assembly 20 includes a stack, generally identified by the numeral 21, of flow plates and membranes. The stack 21 is clamped between manifold plates 22 and 23 by means of elongated bolts 19 which extend along opposite ends of the stack 21. The exchange assembly is completed by a pair of side manifold plates 24 and 25 which are clamped against the edges of the flow plates of the stack 21 and are secured to one another and to the manifolds 22,23 by means of bolts 26.

Reference is now made to FIG. 3 wherein there is illustrated a typical flow plate 27 and a typical tubular membrane 28 which are assembled together in telescoped relation with the membrane 28 being telescoped over the flow plate 27 and a plurality of the assembled flow plates 27 and the membranes 28 being arranged in stacked relation to form the stack 21.

Although the flow plates 27 may be formed of any suitable construction, it is preferably formed of a suitable readily moldable plastic material which is nontoxic and preferably insert as far as the fluids with which it is to be utilized are concerned.

Each flow plate 27 is provided with planar end portions 30 having a centrally-located manifold port 31 extending therethrough. Dual flow passages 32 are formed in one surface only of each end portion 30 and extend transversely of the flow plate 27 from the manifold port 31 to a further port 33 extending entirely through the flow plate 27. Further dual flow passages 34 extend from the port 33 on the opposite face of the end portion 30 to a flow passage 35 disposed adjacent an edge of the flow plate 27 and extending longitudinally thereof. The dual flow passages 32,34 are provided so that there can be no collapsing of the membrane 28 so as to close the same.

It is to be noted that the opposite side edges of the flow plate 27 are recessed between the end portions 30 so that the central portion of the flow plate 27 is narrower in width. The opposite faces of the flow plate 27 in this central area are provided with a plurality of upstanding ribs 37 which define therebetween flow grooves or passages 38. The grooves or passages 28 on opposite sides of the flow plate 27 extend diagonally in crossing relation.

The recessed edge portions of the flow plates 27 are filled with special nose pieces, generally identified by the numeral 40, which have a dual purpose as will be explained hereinafter. As is best shown in FIG. 6, a typical nose piece 40 includes a V-shaped nose portion 41 which is provided at longitudinally spaced intervals with relatively large pins or buttons 42. Extending from each pin or button 42 is a small diameter pin 43 which is received in a like bore 44 in the recessed edge of the flow plate 27.

The opposite ends of each nose piece 40 are engaged over a reduced cross section rounded portion 45 at each end of the recessed edge of the flow plate 27, as is illustrated in FIG. 5. The associated passage 35 leads into the recessed edge portion through the portion 45 so that there is fluid flow inwardly of and behind the nose piece 40, and whereby fluid may either be supplied to or received from the grooves 38.

At this time it is particularly pointed out that inasmuch as the nose pieces 40 may be readily removed from the remainder of the flow plates 27, cleansing and sterilization of the flow plates is readily facilitated.

After the nose pieces 40 have been assembled with the remainder of the flow plates 27, the tubular membranes 28 are telescoped over the flow plates 27 to complete an assembly. The tubular membranes 28 are provided at the opposite ends thereof with transversely aligned manifold openings 46 which are aligned with the manifold ports 31. The openings 46 may be formed in the membranes 28 either prior to assembly or under certain conditions may all be formed with a single tool utilizing the manifolds 31 as guides in the formation of the openings 46 in the assembled flow plates and membranes.

At this time it is also pointed out that the tubular membranes 28 are preferably formed of a special material. Cellulose tubing has been found to be an excellent material for forming the membranes for an artificial kidney and silicon-polycarbonate tubing for an artificial lung.

Referring now to FIG. 2, it will be seen that the stack 21 of assembled flow plates 27 and membranes 28 are positioned on the manifold plate 22. The manifold plate 22 is provided with an inlet fitting 47 which are aligned with the openings 46 in one end of the stack 21 for the purpose of supplying a suitable transfer fluid to the flow plates 27 within the membranes 28.

The manifold plate 23 is disposed in overlying relation with respect to the stack 21 and with an outlet fitting 48 therein in alignment with the other set of openings 46 in the stack 21. The manifolds 22 and 23 are secured together by the bolts 19 with the manifolds 22 and 23 tightly clamping together the stack 21. It is to be understood that the pressure exerted on the stack 21 by the manifolds 22 and 23 is sufficient to cause a sealing of the membranes 28 to the end portions 30 of the flow plates 27 so that there can be no escape of fluid either between contacting surfaces of adjacent membranes 28 or between contacting surfaces of the membranes and the flow plates telescoped therein.

It will be readily apparent from FIG. 3 that if fluid is supplied to the flow plate 27 through the manifold port 31 at the left side thereof, as viewed in FIG. 3, the fluid will flow to the far or right side edge of the manifold plate and then will run through the grooves 38 back across the central portion of the flow plate to the left or near side edge thereof and be collected behind the associated nose piece 40 in the channel defined thereby. The flow of the fluid will then be towards the right end portion 30 and out through the manifold port 31 thereof.

It will be readily apparent that the fluid flowing into the stack 21 through the inlet fitting 47 and out through the outlet fitting 48 will flow uniformly across opposite faces of the flow plates 27 and that there will be no restriction to flow due to the particular configurations of the flow passages and ports and the distributing and collection channels defined by the nose pieces 40.

The exchange assembly 20 is completed by applying to the opposite faces of the stack 21 in opposition to the edges of the flow plates 27 the manifold plates 24 and 25. The manifold plates 24 and 25 are tightly clamped against the stack 21 in sealing relation by the aforementioned bolts 26 and normally no further sealant is required although a suitable sealant could be applied to the end portions of the stack 21 along the opposite edges thereof. It is to be noted that the manifold plates 24,25 will clamp the membrane 28 against the square cut end portions 30 of the flow plates 27 to form the necessary seal.

The manifold plate 25 is provided with an inlet manifold 50 of a configuration to provide for a uniform distribution along the stack 21. In a like manner, the manifold plate 24 is provided with a collection manifold 51 for receiving the second fluid supplied by the manifold 50.

With particular reference to FIGS. 2 and 8, it will be readily apparent that fluid supplied by the manifold 50 will be delivered to the stack 21 at one end thereof and there will be fluid flow through the stack 21 between the adjacent membranes 28. The fluid will be readily led between the membranes by the nose configurations of the flow plates 27, as is clearly shown in FIG. 8, and the pressure of the fluid supplied by the manifold 50 will be in excess of the pressure of the fluid supplied by the inlet fitting 47 to assure deformation of the membrane 28 partially into the grooves 38 so that the second fluid will define its own flow passages between the membranes 28, these flow passages being generally identified by the numeral 52.

The fluid flowing between the stack 21 will be in exchange relation with respect to the fluid flowing vertically through the stack 21 within the membranes 28 so that the necessary exchange may take place through the membrane 28. It is for this reason that the membrane 28 must be formed of a special suitable material such as cuprophan in order to obtain the necessary transfer.

It will be readily apparent that there is not only uniform fluid flow across the opposite faces of the flow plates 27, but also between the opposed faces of the flow plates 27. In this manner, a maximum and uniform exchange is obtained. While the exchange assembly will have many uses, it is to be understood that a principal use thereof will be as an artificial kidney. In such event, the fluid flowing transversely through the stack 21 and supplied by the manifold plate 25 will be blood. Any suitable exchange medium may be supplied the stack 21 through the inlet fitting 47.

Reference is now made to FIGS. 9 and 10 wherein there is illustrated a slightly modified form of flow plate which is generally identified by the numeral 57. The flow plate 57 corresponds favorably to the construction of the flow plates 27. However, in lieu of the opposite faces of the central portion thereof being provided with ribs defining grooves or flow passages, the central portion of the flow plates 57 are provided with a plurality of upstanding projections, such as cones or pyramids 58. These projections define random flow passages across the faces of the flow plates 57. Each flow plate 57 is telescoped within a tubular membrane 28 in the aforedescribed manner.

The projections 58 cannot directly oppose one another inasmuch as it is possible for them to internest in a manner whereby uniform flow will not result. Accordingly, when the flow plates 57 are utilized in forming the stack 21, it is necessary to place between each flow plate 57, which has been telescoped within a membrane 28, a thin separator sheet 60, as is best shown in FIG. 9. The separator sheet 60 is preferably formed of a suitable non-toxic material. It has been found that 60 mil MYLAR will perform satisfactory as a separator sheet. It is also to be noted that each separator sheet 60 is provided with an opening 61 in the opposite end portions thereof. The opening 61 align with the opening 46 formed in the membrane 48 so as to facilitate flow vertically through the stack 21.

Referring now to FIG. 10, it will be seen that when the stack includes the flow plates 57 and the separators 60, the separators 60 extend substantially to the manifold plates 24 and 25 of which only the manifold plate 25 is illustrated. Thus, fluid flowing from the manifold plate 25 into the stack 21 will pass between each separator plate 60 and the nose of the adjacent flow plate 57 and will be directed into the space between the separator plate 60 and adjacent portions of the membranes 28.

It is to be noted that although the stack includes the separator plates 60, this in no way interferes with the exchange operation. The flow plates 60 merely divide the flow between adjacent flow plates into two laminar flow pass with each flow pass opposing a membrane 28 and being separated thereby from the adjacent flow pass across the face of the adjacent flow plate 57.

It is to be understood that the operation of the exchange assembly, when provided with either of the flow plates 27 and 57 will be the same. Uniform and maximum flow is possible with there being uniform and maximum exchange between the two fluids flowing through the exchange assembly.

Although only two preferred embodiments of the invention have been specifically illustrated and described herein, it is to be understood that minor variations may be made in the exchange assembly without departing from the spirit and scope of the invention, as defined by the appended claims.

I claim:

1. An exchange assembly comprising a plurality of generally flat flow plates arranged in stacked relation, a membrane sleeve telescoped over each flow plate, each flow plate having formed on opposite surfaces thereof flow path defining means, a housing clamping said stacked flow plates and sleeves together generally in fluid tight relation, said housing including first circulating means for circulating a first fluid between said flow plates and said sleeves at a first pressure and in a direction defined by said flow path defining means and second circulating means for circulating a second fluid at a second and higher pressure between adjacent ones of said sleeves with said second pressure partially deforming said sleeves into said flow paths and defining other flow paths, said other flow paths being formed in said sleeves at the surface thereof remote from the respective flow plate solely by the deformation of said sleeves against said flow plates and being generally parallel to the direction of said first flow path defining means.

2. The exchange assembly of claim 1 wherein said housing includes a pair of first manifold plates, and means clamping together said first manifold plates with said stack of sleeve encased flow plates clamped therebetween with said first manifold plates engaging face surfaces of endmost ones of said sleeves, and said first circulating means being carried by said first manifold plates.

3. The exchange assembly of claim 2 wherein edges of said flow plates are provided with aligned notches forming manifold ports, and second fluid manifold plates sealed to opposite sides of said flow plate stack and having flow ports aligned with said manifold ports.

4. The exchange assembly of claim 3 wherein said flow plate edges are of a rigid configuration in communication with said manifold ports to facilitate uniform flow of said second fluid between said sleeve encased flow plates.

5. The exchange assembly of claim 2 wherein opposite end portions of said flow plates and said sleeves are perforated to form manifold ports through said stack, and flow channels in said flow plates communicating said manifold ports with said flow paths.

6. The exchange assembly of claim 5 wherein said flow channels include distribution and collection channels extending generally along and adjacent opposite edges of said flow plates.

7. The exchange assembly of claim 6 wherein said distribution and collection channels are defined by separately formed edge strips.

8. The exchange assembly of claim 6 wherein said flow path defining means are in the form of grooves extending transversely of said flow plates between said distribution and collection channels.

9. The exchange device of claim 8 wherein said grooves slope slightly relative to a normal to said distribution and collection channels, and said grooves on opposing flow plate surfaces being in crossing relation.

10. The exchange assembly of claim 6 wherein said flow path defining means are in the form of adjacently disposed upstanding projections, and there is a separator between each sleeve encased flow plate.

11. An exchange assembly in accordance with claim 1 wherein adjacent portions of adjacent ones of said sleeves are in face-to-face engagement, and said other flow paths are formed solely between adjacent sleeve portions.

* * * * *